US008077430B2

(12) United States Patent
Chan et al.

(10) Patent No.: US 8,077,430 B2
(45) Date of Patent: Dec. 13, 2011

(54) SYSTEM AND APPARATUS FOR MASS-BALANCED SPOILER IN DISK STORAGE DEVICES

(75) Inventors: Andre S. Chan, Milpitas, CA (US); Ferdinand Hendriks, Morgan Hill, CA (US); Keiichi Takemori, Mito (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 769 days.

(21) Appl. No.: 11/867,083

(22) Filed: Oct. 4, 2007

(65) Prior Publication Data
US 2009/0091857 A1    Apr. 9, 2009

(51) Int. Cl.
*G11B 33/14* (2006.01)
(52) U.S. Cl. .................. 360/97.02; 360/97.01
(58) Field of Classification Search ..... 360/97.01–97.02
See application file for complete search history.

(56) References Cited

U.S. PATENT DOCUMENTS

| | | | | |
|---|---|---|---|---|
| 4,501,398 A | * | 2/1985 | Sandorff | 244/134 R |
| 4,522,360 A | * | 6/1985 | Barnwell et al. | 244/204 |
| 5,016,837 A | * | 5/1991 | Willis | 244/12.1 |
| 5,056,741 A | * | 10/1991 | Bliesner et al. | 244/214 |
| RE34,207 E | * | 3/1993 | Nelson et al. | 416/226 |
| 5,402,969 A | * | 4/1995 | Shea | 244/36 |
| 5,898,545 A | | 4/1999 | Schirle | |
| 6,560,065 B1 | | 5/2003 | Yang et al. | |
| 6,600,625 B1 | * | 7/2003 | Munninghoff et al. | 360/97.02 |
| 6,700,736 B1 | | 3/2004 | Wu et al. | |
| 6,788,493 B1 | * | 9/2004 | Subramaniam et al. | 360/97.02 |
| 6,961,209 B2 | * | 11/2005 | Bement et al. | 360/97.02 |
| 6,972,926 B1 | | 12/2005 | Codilian | |
| 7,027,259 B2 | | 4/2006 | Myokan et al. | |
| 7,123,439 B2 | | 10/2006 | Chan et al. | |
| 2005/0041332 A1 | * | 2/2005 | Chan et al. | 360/97.02 |

FOREIGN PATENT DOCUMENTS

JP    63269392    11/1988

OTHER PUBLICATIONS

Ono, Kyosuke, Study of Nanodynamics in Hard Disk Drive Technology, Micro-Nanomechatronics and Human Science, Oct. 31-Nov. 3, 2004, pp. 47-55.
Ikegawa, Masato, et al., Decreasing Airflow Velocity in Hard Disk Drives with a Spoiler and Bypass, IEEE Transactions on Magnetics, vol. 42, No. 10, Oct. 2006.
Hirono, Yoshiyuki, et al, Flow-Induced Vibration Reduction in HDD by Using a Spoiler, IEEE Transactions on Magnetics, vol. 40, No. 4, Jul. 2004.
Takada, Shigenori, Experimental Study on Flow-Induced Disk Flutter Dynamics by Measuring the Pressure Between Disks, Journal of Fluids Engineering, Mar. 2007, vol. 129, Issue 3, pp. 368-375.

* cited by examiner

*Primary Examiner* — Daniell L Negron
*Assistant Examiner* — Carlos E Garcia

(57) ABSTRACT

A system and apparatus for reducing flutter in disk drive spoilers positions the center of mass of the mean aerodynamic section of the spoiler at or ahead of the quarter-chord location nearest the leading edge of the spoiler. A balance weight may be formed in or attached to the spoiler. The center of gravity is located no farther back from the leading edge than one quarter-chord in a direction of the flow field. Alternatively, the spoiler trailing edge is lightened by making the trailing edge more porous or thinner than other sections of the spoiler.

15 Claims, 2 Drawing Sheets

SYSTEM AND APPARATUS FOR MASS-BALANCED SPOILER IN DISK STORAGE DEVICES

BACKGROUND OF THE INVENTION

1. Technical Field

The present invention relates in general to an improved architecture for conditioning air flow inside data storage devices and, in particular, to an improved system and apparatus for mass balancing aerodynamic spoilers for disk storage devices.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and micro drive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over the disk on an air bearing to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

One of the major hurdles in hard disk drive (HDD) development is track misregistration (TMR). TMR is the term used for measuring data errors while a HDD writes data to and reads data from the disks. One of the major contributors to TMR is flow-induced vibration. Flow-induced vibration is caused by turbulent flow within the HDD. The nature of the flow inside a HDD is characterized by the Reynolds number, which is proportional to a characteristic speed in the drive (such as the speed at the outer diameter of the disk), and a characteristic dimension (such as the disk diameter or, for some purposes, disk spacing). In general, the higher the Reynolds number, the greater the propensity of the flow to be turbulent.

Due to the high rotational speed of the disks and the complex geometries of the HDD components, the flow pattern inside a HDD is inherently unstable and non-uniform in space and time. The combination of flow fluctuations and component vibrations are commonly referred to as "flutter" in the HDD literature. The terms "disk flutter" and "arm flutter" refer to buffeting of the disk and arm, respectively, by the air flow. Unlike true flutter, the effect of the vibrations in HDDs on the flow field is usually negligible. Even small arm and disk vibrations (at sufficiently large frequencies, e.g., 5 kHz and higher), challenge the ability of the HDD servo system to precisely follow a track on the disk.

Since the forcing function of vibrations is directly related to flow fluctuations, it is highly desirable to reduce any fluctuating variation in the flow structures of air between both co-rotating disks and single rotating disks. One technology for reducing flow-induced vibration in high capacity disk drives is the aerodynamic spoiler. Spoilers with windows or otherwise mechanically-weakened structures are often effective as spoilers. However, a disadvantage of putting windows or otherwise weakening spoiler structure is that the spoiler may flutter. This is true flutter in the sense that the aero-elastic system composed of the spoiler and the airflow created by the disks has negative damping (i.e., upon deflection, the spoiler amplifies the flow field) in a linear, small amplitude sense. When negative damping occurs, the spoiler executes limit-cycle oscillations, the amplitude of which is limited by either structural failure or non-linear effects.

Attempts to address these problems include stiffening the structure of aerodynamic spoilers, modifying their aerodynamic shape, and reducing disk speed. However, drawbacks to these solutions often defeat the primary purpose of the spoiler, and cause a reduction in the performance of the drive itself, neither of which is desirable. Thus, a system and apparatus for improving the architecture for conditioning air flow inside data storage devices would be desirable.

SUMMARY OF THE INVENTION

Embodiments of a system and apparatus of the present invention apply several techniques to reduce track misregistration (TMR) problems in hard disk drives (HDD). Some of the solutions presented herein position the center of mass of the mean aerodynamic section of the spoiler at or ahead of the quarter-chord location nearest the leading edge of the spoiler. For example, a balance weight formed from an HDD-qualified metal may be molded into the spoiler. The center of gravity is located no farther back from the leading edge than one quarter-chord in a direction of the flow field.

Alternatively, a balance weight may be positioned on the spoiler, such as an embedded feature or surface attachment. In another embodiment, the spoiler trailing edge is lightened without using a balance weight, such as by making the trailing edge more porous or thinner than other sections of the spoiler. This design permits the center of gravity to be positioned in a desired location without a balance weight, which allows windows and other aerodynamically desirable features to be added without flutter danger. The flow-conditioning solutions of the present application reduce the turbulence intensity throughout the HDD to reduce TMR. These solutions achieve these goals while minimizing increases in the running torque needed to overcome their inherent rotational drag.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
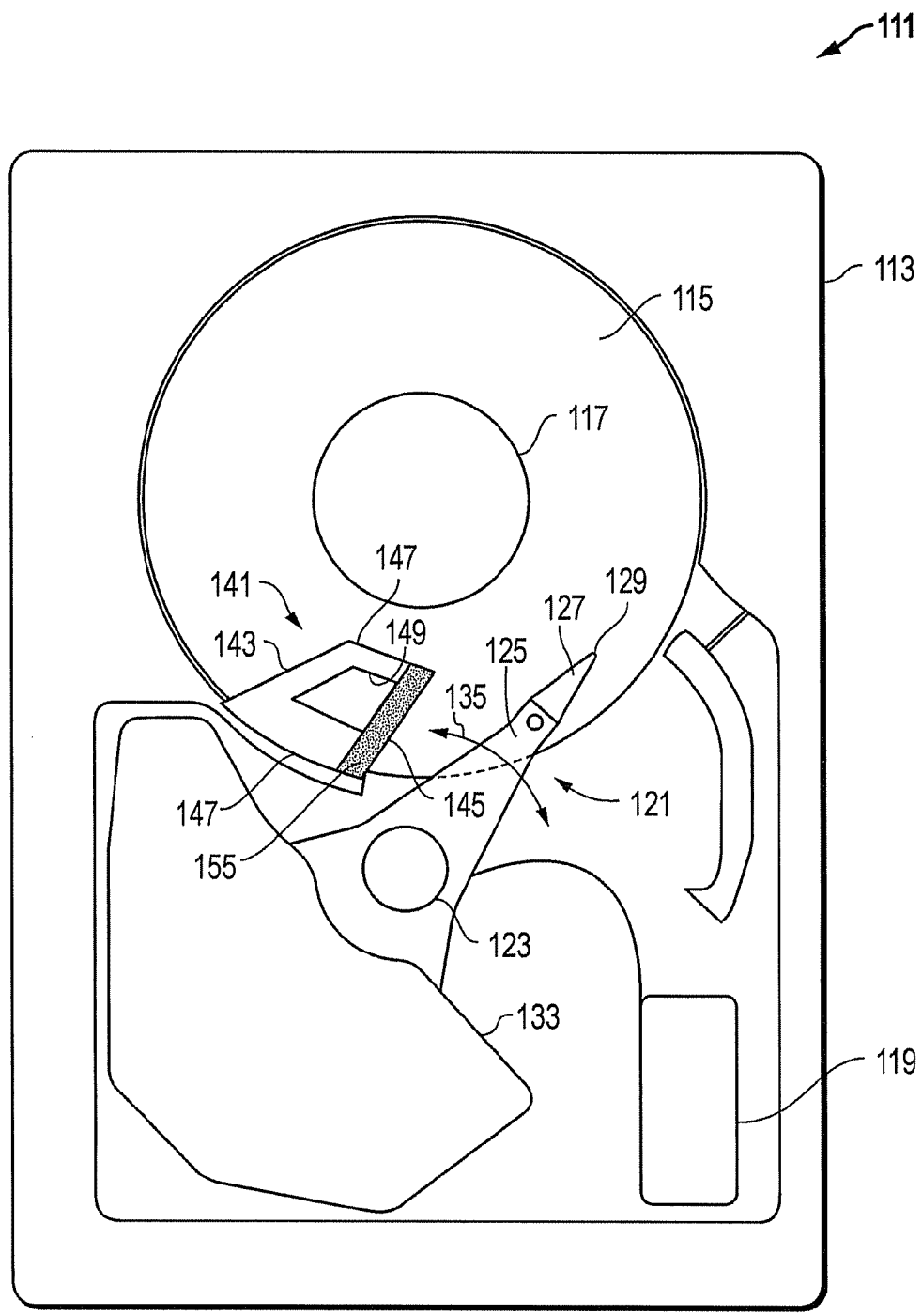
FIG. 1 is a top plan view of one embodiment of a disk drive constructed in accordance with the invention.

Referring to FIG. 1, one embodiment of a system, method, and apparatus for reducing track misregistration in disk drives is shown. This embodiment employs an information storage system comprising a magnetic hard disk file or drive 111 for a computer system. Drive 111 has an outer housing or base 113 (e.g., an enclosure) containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each arm 125. The read/write heads magnetically read data from and/or magnetically write data to disk 115. The level of integration called the head gimbal assembly is head and the slider 129, which are mounted on suspension 127. The slider 129 is usually bonded to the end of suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
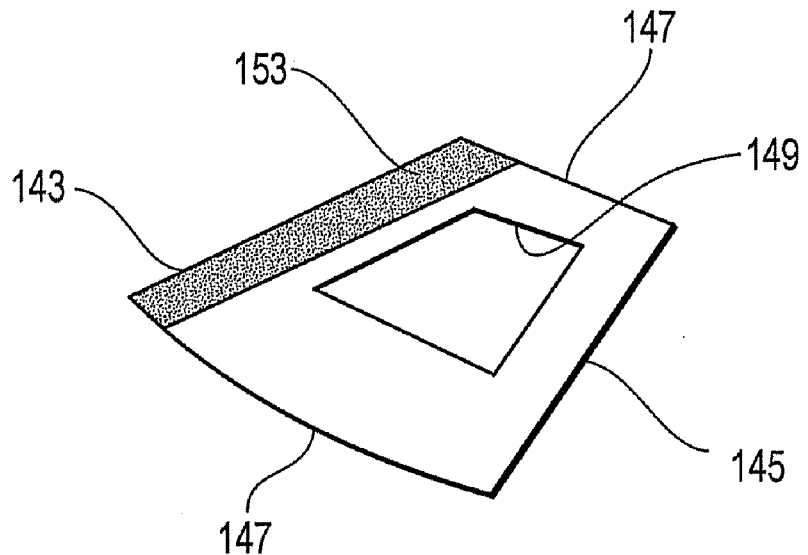
FIG. 2 is a top view of one embodiment of a spoiler constructed in accordance with the invention.
Figure 3:
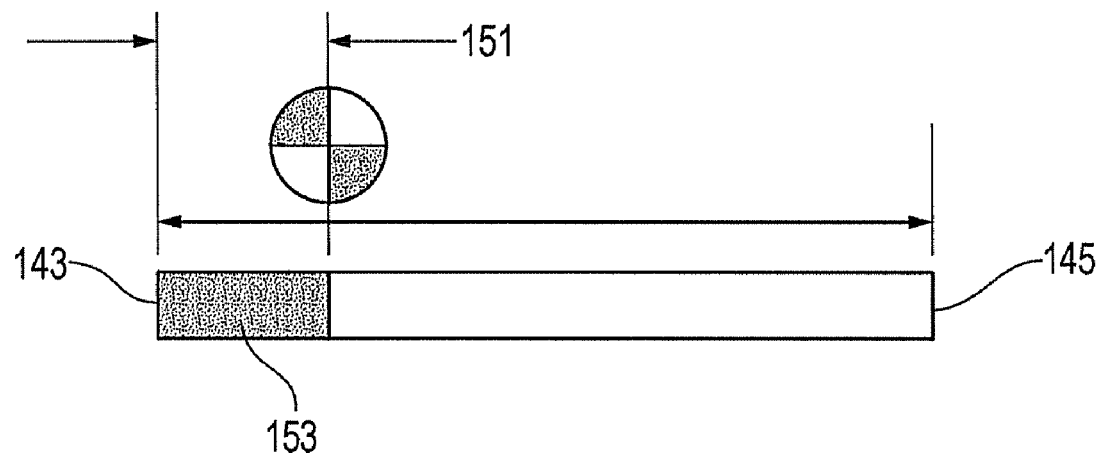
FIG. 3 is a sectional side view of another embodiment of a spoiler constructed in accordance with the invention.

Referring now to FIGS. 1-3, drive 111 further comprises a spoiler 141 that is mounted to the enclosure 113 adjacent to the disk 115. The spoiler 141 comprises one or more air flow field devices that may be either symmetrically or asymmetrically arrayed about the disk 115, depending upon the application. Each spoiler 141 comprises a foundation or support post that is mounted to the enclosure 113. The support post may be mounted to and extend between the base and cover of the enclosure. Spoilers may be part of a comb structure inserted among the disks.

The one or more spoilers 141 project radially inward toward hub 117 from a position that is outboard of the outer diameter of the disk 115, and are parallel to the planar surfaces of the disks 115. When two or more spoilers 141 are used, a slot is defined between them that closely receives the two parallel surfaces of one of the disks 115. The spoilers 141 originate at the support post and preferably extend radially to or near the disk hub 117. However, there is no contact between any portion of the spoiler 141 and the disks 115.

In one embodiment, each spoiler comprises a trapezoidal shape (in top view) having a leading edge 143, a trailing edge 145, and lateral side edges 147 that extend between the leading and trailing edges 143, 145.

The spoilers 141 are positioned in the air flow stream generated by the disks 115 so that, as the disks 115 rotate, the spoilers 141 are aligned with the air flow stream and reduce an air flow turbulence intensity and track misregistration between the heads on the sliders 129 and the read/write tracks on the disks 115. The turbulent energy generated by the spoiler(s) 141 is confined to a range of smaller eddies that are more easily dissipated within the disk drive 111 than prior art large eddies. Furthermore, spoilers deflect the airflow toward the disk inner diameter, where disk vibrations are more difficult to excite.

As shown in FIGS. 1-3, the spoilers 141 may comprise many different configurations. For example, the spoiler 141 may be configured with an optional open window 149 that is located between the edges 143, 145, 147. The spoiler 141 has a chord length C (FIG. 3) extending in a direction of the air flow field. In one embodiment (FIGS. 2 and 3), the center of mass of the mean aerodynamic section of the spoiler may be at or ahead (i.e., toward leading edge 143) of the quarter-chord location 151 (FIG. 3). To position the center of mass in this manner, a balance weight 153 (formed from, e.g., an HDD-qualified metal) may be molded into or embedded in the spoiler 141. The center of gravity is located no farther back from the leading edge 143 than one quarter-chord in a direction of the flow field. The balance weight 153 may extend completely across or adjacent to the entire leading edge 143, and extend completely between the lateral side edges 147.

Alternatively, the balance weight may be positioned on a surface of the spoiler 141. In another embodiment (FIG. 1), the spoiler trailing portion 155 is lightened without using a balance weight. For example, the trailing portion 155 may be fabricated as porous, or more porous or thinner than other sections of the spoiler 141 relative to an axis of the disk 115. The modified trailing portion 155 may extend completely across or adjacent to the entire trailing edge 145 between the lateral side edges 147. This design permits the center of gravity to be positioned in a desired location without a balance weight, which allow the window 149 and other aerodynamically desirable features to be added without flutter danger.

The present invention has several advantages, including the ability to reduce TMR problems in HDDs. These solutions break up large-scale eddies, and turbulence intensity is reduced throughout the HDD to reduce TMR while minimizing increases in the running torque needed to overcome rotational drag. The turbulent energy generated by the devices is confined to a range of smaller eddies that are more easily dissipated. The large eddy break up devices can be used individually or as multiple units in series.

While the invention has been shown or described in only some of its forms, it should be apparent to those skilled in the art that it is not so limited, but is susceptible to various changes without departing from the scope of the invention.

What is claimed is:

1. A disk drive, comprising:
   an enclosure;
   a disk mounted to the enclosure for rotation relative thereto, the disk having a surface with tracks;
   an actuator having a head and mounted to the enclosure for moving the head relative to the disk such that the head reads information from and writes information to the tracks on the disk;
   a spoiler mounted to the enclosure adjacent to the disk, the spoiler extending radially with respect to the disk and parallel to the surface of the disk, the spoiler having a leading edge, a trailing edge downstream from the leading edge, lateral side edges between the leading and trailing edges, a chord length extending in a direction of an air flow field between the leading and trailing edges, and a center of gravity located along the chord length at a position that is no more than approximately one-fourth of the chord length from the leading edge; and
   a porous trailing portion is located on and extends from the trailing edge toward the leading edge, and the porous trailing portion causes the center of gravity to be no more than approximately one-fourth of the chord length from the leading edge.

2. A disk drive according to claim 1, wherein a weight is secured to the spoiler to position the center of gravity no more than approximately one-fourth of the chord length from the leading edge.

3. A disk drive according to claim 2, wherein the weight is molded in the spoiler.

4. A disk drive according to claim 2, wherein the weight is attached to a surface of the spoiler.

5. A disk drive according to claim 2, wherein the weight is substantially adjacent to the leading edge and extends substantially between the lateral side edges.

6. A disk drive according to claim 1, wherein the trailing portion is thinner in an axial direction relative to the disk than a leading portion of the spoiler.

7. A disk drive according to claim 1, wherein the actuator is located downstream of the spoiler.

8. A disk drive according to claim 1, wherein the trailing portion extends completely across the entire trailing edge between the lateral side edges.

9. A disk drive according to claim 1, further comprising an open window between the leading, trailing and lateral side edges.

10. A disk drive, comprising:
    an enclosure;
    a disk mounted to the enclosure for rotation relative thereto, the disk having a surface with tracks;
    an actuator having a head and mounted to the enclosure for moving the head relative to the disk such that the head reads information from and writes information to the tracks on the disk, and the actuator is located downstream of the spoiler;
    a spoiler mounted to the enclosure adjacent to the disk, the spoiler extending radially with respect to the disk and parallel to the surface of the disk, the spoiler having a leading edge, a trailing edge downstream from the leading edge, lateral side edges between the leading and trailing edges, and a chord length extending in a direction of an air flow field between the leading and trailing edges; and
    a trailing portion of the spoiler is located on the trailing edge and extends toward the leading edge, the trailing portion extends completely across the entire trailing edge between the lateral side edges, and the trailing portion causes a position of a center of gravity of the spoiler along the chord length to be no more than approximately one-fourth of the chord length from the leading edge.

11. A disk drive according to claim 10, wherein the trailing portion is porous.

12. A disk drive according to claim 10, wherein the trailing portion is more porous than a leading portion of the spoiler.

13. A disk drive according to claim 10, wherein the trailing portion is thinner in an axial direction relative to the disk than a leading portion of the spoiler.

14. A disk drive according to claim 10, further comprising an open window between the leading, trailing and lateral side edges.

15. A disk drive, comprising:
    an enclosure;
    a disk mounted to the enclosure for rotation relative thereto, the disk having a surface with tracks;
    an actuator having a head and mounted to the enclosure for moving the head relative to the disk such that the head reads information from and writes information to the tracks on the disk; and
    a spoiler mounted to the enclosure adjacent to the disk, the spoiler extending radially with respect to the disk and having a leading edge, a trailing edge that is porous and downstream from the leading edge, lateral side edges between the leading and trailing edges, an open window between the leading, trailing and lateral side edges, the open window extends to the porous trailing edge, a chord length extending in a direction of an air flow field between the leading and trailing edges, and a center of gravity located along the chord length at a position that is no more than approximately one-fourth of the chord length from the leading edge.

* * * * *